United States Patent Office 3,816,408
Patented June 11, 1974

---

3,816,408
NOVEL AZETIDINONES AND THEIR USE TO INHIBIT LACTAMASE ENZYMES THAT DESTROY β-LACTAM ANITBIOTICS
Jan Mieczyslaw Zygmunt Gladych and Clive Wilfred Theodore Hussey, London, England, assignors to Allen & Hanburys Limited, London, England
No Drawing. Filed Apr. 19, 1971, Ser. No. 135,498
Claims priority, application Great Britain, May 8, 1970, 22,314/70
Int. Cl. C07d 25/02
U.S. Cl. 260—239 A          6 Claims

ABSTRACT OF THE DISCLOSURE

Compounds of the formula:

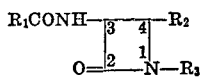

in which $R_1$ represents an aryl, arylalkyl, or aryloxyalkyl group in which the aryl group or moiety may optionally be substituted by one or more alkyl, alkoxy, haloacetamido, nitro or amino groups or halogen atoms and the alkyl chain may optionally be substituted by an azido, amino, carboxyl, or alkoxy group; or $R_1$ represents a group (in which Z represents H, $NH_2$, or $N_3$) of the following formula:

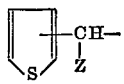

$R_2$ represents a phenyl or naphthyl group which may optionally be substituted with one or more alkoxy groups or halogen atoms; and $R_3$ represents H or an alkyl group containing from 1 to 4 carbon atoms or $R_3$ may be an acyl or alkoxy carbonyl group, and acid addition salts thereof.

These compounds inhibit lactamase enzymes which destroy β-lactam antibiotics.

---

This invention relates to penicillinase inhibitors.

We have found that certain azetidinones can inhibit lactamase enzymes that bring about the destruction of β-lactam antibiotics in vivo and in vitro.

This action is of importance since many bacterial strains become resistant to the action of antibiotics by virtue of their capacity to produce such lactamase and such inhibitors can restore the sensitivity of these resistant strains, although they have no antibacterial activity *per se*. Thus a combination of the compounds of the invention having this action and a β-lactam antibiotic, e.g. penicillin G or its salts, may be used to treat infections due to resistant strains of a bacterial species normally sensitive to the antibiotic, e.g. staphylococcal infections in man and in animals.

The invention provides compounds of the following structural formula and acid addition salts thereof:

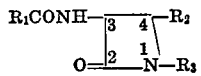 (I)

in which $R_1$ represents an aryl, arylalkyl, or aryloxyalkyl group in which the aryl group or moiety may optionally be substituted by one or more alkyl, alkoxy, haloacetamido, nitro or amino groups or halogen atoms and the alkyl chain may optionally be substituted by an azido, amino, carboxyl, or alkoxy group; or $R_1$ represents a group (in which Z represents H, $NH_2$, or $N_3$) of the following formula:

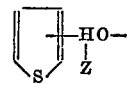

$R_2$ represents a phenyl or naphthyl group which may optionally be substituted with one or more alkoxy groups or halogen atoms; and $R_3$ represents H or an alkyl group containing from 1 to 4 carbon atoms or $R_3$ may be an acyl or alkoxy carbonyl group.

Preferred compounds according to the invention are those set out below:

4-Phenyl-3-phenylacetamido-2-azetidinone.
4-(p-Methoxyphenyl)-3-phenylacetamido-2-azetidinone.
4-(2-Naphthyl)-3-phenylacetamido-2-azetidinone.
4-(p-Chlorophenyl)-3-phenylacetamido-2-azetidinone.
3-(α-Azidophenylacetamido)-4-phenyl-2-azetidinone.
3-[p-(2-Chloroacetamido)phenyl-acetamido]-4-phenyl-2-azetidinone.
3-[p-(2,2-Dichloroacetamido)phenylacetamido]-4-phenyl-2-azetidinone.
3-(p-Nitrophenylacetamido)-4-phenyl-2-azetidinone.
3-Phenoxyacetamido-4-phenyl-2-azetidinone.
3-(α-Aminophenylacetamido)-4-phenyl-2-azetidinone.
4-Phenyl-3-(2-thienylacetamido)-2-azetidinone.
3-(2,6-Dimethoxybenzamido)-4-phenyl-2-azetidinone.
3-(p-Aminophenylacetamido)-4-phenyl-2-azetidinone hydrochloride.
1-Carbethoxy-4-phenyl-3-phenylacetamido-2-azetidinone.
1-Methyl-4-phenyl-3-phenylacetamido-2-azetidinone.
1-Formyl-4-phenyl-3-phenylacetamido-2-azetidinone.

The compounds according to the invention may be formulated for use in a conventional manner with the aid of carriers or excipients and other formulating agents as required and with or without other medicinal agents, particularly β-lactam antibiotics such as penicillin G or its salts.

Particularly useful formulations for veterinary purposes include those for intramammary administration in which the compounds of the invention are used together with a β-lactam antibiotic in oily or water-miscible bases. Such bases may be varied, for example, by the addition of aluminium stearate to give varying rates of drug release.

Oral administration is most convenient in the form of tablets which may or may not be coated, capsules, solutions, or aqueous oil suspensions, emulsions or pastes.

Injections may be formulated as either solutions or suspensions with or without supplementary medicinal agents as desired.

A preferred β-lactam antibiotic is penicillin G or its salts.

The effective doses of the compounds of the invention may vary within a wide range, for example, 50–500 mg. for intramammary administration, and 0.25–25 mg./kg. for systemic use.

The compounds according to the invention may be prepared by the acylation of amino azetidinones of formula (II) with an acylating agent $R_1.COX$ where X represents halogen, hydroxy, alkoxy, or acyloxy.

Where X is hydroxy the reaction can be effected in the presence of a condensing agent such as carbonylbisimidazole or dicyclohexyl carbodimide; where X is halogen the presence of a base, for example triethylamine or magnesium carbonate is advantageous. These reactions are best carried out in an inert solvent, for example benzene, chloroform, methylene chloride or carbon tetrachloride.

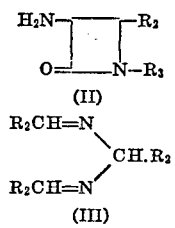

The product may be recovered as a salt where the compound is salt forming. Thus if it contains an amino substitutuent it is capable of forming an acid-addition salt and thus may conveniently be isolated as the hydrochloride.

The azetidinones of formula (II) where $R_3$ is H can be prepared from aldehyde ammonias of formula (III) by reactions either with phthaloyl glycyl chloride (IV) followed by removal of the phthaloyl group, or with azidoacetyl chloride (V) followed by reduction of the azido azetidinone (VI) for example by catalytic hydrogenation, or chemical reducing agents such as zinc/hydrochloric acid.

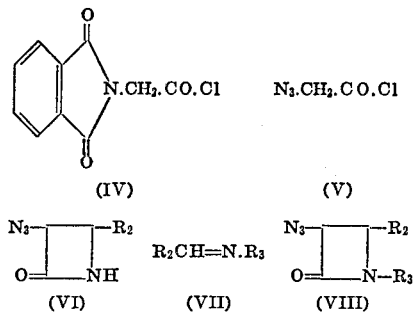

The formation of the azetidine ring is best carried out in an inert solvent, for example benzene or methylene chloride in the presence of a strong organic base, e.g. triethylamine. Compounds of the invention where $R_3$ is an alkyl group can be prepared by similar processes from (IV) or (V) and the azomethine (VII). Alternatively the azetidinone (VI) may be treated with an alkyl halide or haloformate preferably in a solvent for example benzene or dimethylformamide or tetrahydrofuran and preferably in the presence of a base, e.g. sodium hydride or sodium carbonate, or triethylamine. The resulting azetidinones (VIII) can then be converted into compounds of the invention by reduction and acylation as described above.

The azetidinones of the invention may also be prepared from other azetidinones, according to the invention by processes involving replacement or conversion of one or more of the groups $R_1$-$R_3$ to other groups within the meaning given. Thus, if $R_1$ represents an arylalkyl group substituted by an azido (—$N_3$) group this may be converted to the corresponding compound containing an amino (—$NH_2$) group, for example by reduction of the $N_3$ group. An example of such a reaction is described in Example 3 below.

Another example of such a conversion, that is one of the groups $R_1$-$R_3$ to other groups within the meaning given is where $R_1$ represents are arylalkyl group substituted by an amino group in the aryl moiety since this may be prepared from the corresponding nitro-substituted compound by reduction. An example of such a reaction is described in Example 5 below. Those compounds in which $R_3$ represents an acyl group, for example a formyl group may be prepared from the corresponding compound in which $R_3$ represents a —$CH_2CH(OC_2H_5)_2$ group by conversion to the formyloxymethyl compound or the substituted acetaldehyde followed by oxidation, as described for example in Example 8 below.

Such compounds in which $R_3$ is acyl may also be prepared by the acylation of the azide (VI) see above and reduction of the azide group to an amino group followed by acylation of the amino group as described.

The in vitro effects of a number of compounds according to the invention on the MIC of pencillin G on a resistant strain of bacteria is given in the Table which follows:

INHIBITION OF LACTAMASE BY SUBSTITUTED 2-AZETIDINONES IN VITRO

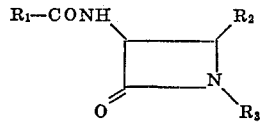

| Example number | $R_1$ | $R_2$ | $R_3$ | MIC of penicillin G in the presence of— | | | | | |
|---|---|---|---|---|---|---|---|---|---|
| | | | | 50 µg. per ml. concentration of inhibitor | 25 µg. per ml. concentration of inhibitor | 12.5 µg. per ml. concentration of inhibitor | 6.25 µg. per ml. concentration of inhibitor | 3.12 µg. per ml. concentration of inhibitor | 0 µg. per ml. concentration of inhibitor |
| 1 | $C_6H_5CH_2$— | $C_6H_5$ | H | 0.11 | 0.22 | 0.45 | 1.9 | (¹) | 31.25 |
| 1 | $C_6H_5CH_2$— | —⟨⟩—$OCH_3$ | H | 0.028 | 0.055 | 0.22 | 0.45 | 0.9 | 62.5 |
| 2 | $C_6H_5$—$CH(N_3)$— | $C_6H_5$ | H | 0.055 | 0.055 | 0.055 | 0.11 | 0.9 | 62.5 |
| 2 | p-$ClCH_2CONH$—$C_6H_5$—$CH_2$— | $C_6H_5$ | H | 0.22 | 0.02 | 0.028 | 0.11 | 0.11 | 31.25 |
| 2 | p-$Cl_2CHCONH$—$C_6H_5$—$CH_2$— | $C_6H_5$ | H | 0.055 | 0.11 | 0.014 | 0.055 | 0.9 | 62.5 |
| 2 | p-$O_2N$—$C_6H_5$—$CH_2$— | $C_6H_5$ | H | 0.028 | 0.028 | 0.014 | 0.028 | 0.055 | 62.5 |
| 4 | 2-thienyl—$CH_2$— | $C_6H_5$ | H | 0.055 | 0.055 | 0.11 | 0.22 | 0.45 | 62.5 |
| 5 | p-$H_2N$—$C_6H_5$—$CH_2$— | $C_6H_5$ | H | 0.22 | 0.055 | 0.11 | 0.45 | 0.22 | 12.5 |
| 8 | $C_6H_5CH_2$— | $C_6H_5$ | CHO | 0.11 | 0.22 | 0.9 | 1.9 | (¹) | 62.5 |

¹ Not done.

NOTE.—MIC=Minimum inhibitory concentration or concentration which completely inhibits visible bacterial growth. Values are given in µg. per ml. at 24 hrs. The penicillin-resistant organism was Staphylococcus aureus $HC_2$.

The following Examples illustrate the invention:

EXAMPLE 1: 4-PHENYL-3-PHENYLACETAMIDO-2-AZETIDINONE (a) 3-Amino-4-phenyl-2-azetidinone (1) Hydrogenation of 3-azido-4-phenyl-2-azetidinone: A solution of 3-azido-4-phenyl-2-azetidinone* (0.188 g.) in ethanol (7 cc.) was hydrogenated at atmospheric pressure and room temperature over pre-reduced Adams' catalyst (0.020 g.). After ca. 25 minutes fresh catalyst (0.020 g.) was added and the hydrogenation carried on for 24 hours. The catalyst was filtered off and the filtrate evaporated in vacuo. The residue was extracted with boiling ethyl acetate and the extract concentrated to a small volume and cooled. The solid was filtered off and dried. A sample was purified by chromatography on silica gel and elution with ethyl acetate-methanol (9:1). Recrystallisation from ethyl acetate gave 3-amino-4-phenyl-2-azetidinone, M.P. 121°.

(2) Hydrazinolysis of 4-phenyl-3-phthalimido-2-azetidinone: 4-Phenyl-3-phthalimido - 2 - azetidinone (5.8 g.), hydrazine hydrate (1.5 cc.) and ethanol (100 cc.) were refluxed for 1.5 hours. The mixture was set aside for 15 hours and then filtered. Evaporation of the filtrate gave an oily residue which was stirred with dilute hyrochloric acid (1 N., 25 cc.) for 15 minutes. The mixture was filtered and the filtrate made alkaline with ammonium hydroxide 5 N., 10 cc.) and saturated with sodium chloride. The aqueous solution was thoroughly extracted with chloroform, and the combined extracts were washed with brine and dried (Na₂SO₄). Evaporation of the solvent gave a solid residue which was dissolved in hot benzene (30 cc.). The solution was concentrated to about 15 cc. and cooled. The solid was washed with benzene by decantation and dried to give 3-amino-4-phenyl-2-azetidinone, M.P. 118–120°.

(b)

Phenylacetic anhydride (1.7 g.) was added rapidly to a stirred solution of 3-amino-4-phenyl-2-azetidinone (10 g.) in methanol (10 cc.) and the mixture stirred for an additional 2 hours. The solid was filtered off, washed with benzene, then with ether and dried, giving 4-phenyl-3-phenylacetamido-2-azetidinone, M.P. 186.5–188.5°.

The following compounds were prepared in a similar manner:

4-(p-Methoxyphenyl) - 3 - phenylacetamido-2-azetidinone, M.P. 214°

4-(2-Naphthyl)-3-phenylacetamido - 2 - azetidinone, M.P. 201–4°

4-(p-Chlorophenyl) - 3 - phenylacetamido-2-azetidinone, M.P. 201–4°.

EXAMPLE 2: 3-(α-AZIDOPHENYLACETAMIDO)-4-PHENYL-2-AZETIDINONE

A solution of dicyclohexylcarbodiimide (0.515 g.) in anhydrous tetrahydrofuran (5 cc.) was added dropwise to a stirred solution of α-azidophenylacetic acid (0.044 g.) and 3-amino-4-phenyl-2-azetidinone (0.400 g.) in anhydrous tetrahydrofuran (16.5 cc.). After the addition the mixture was stirred for 15 minutes and set aside for 15 hours. The solid was filtered off, and washed thoroughly with tetrahydrofuran. The filtrate and washings were combined and evaporated in vacuo. The residue was heated with benzene (10 cc.) for 15 minutes and then cooled. The solid was filtered off, washed with benzene, then with ether, and dried to give 3-(α-azidophenylacetamido)-4-phenyl-2-azetidinone, M.P. 193–195° (decomp.).

The following compounds were prepared in a similar manner:

3-[p-2-Chloroacetamido)phenyl-acetamido] - 4 - phenyl-2-azetidione, M.P. 188–188.5° (decomp).

3-[p-(2,2-Dichloroacetamido)phenylacetamido]-4-phenyl-2-azetidinone, M.P. 203–205° (decomp).

3-(p-Nitrophenylacetamido)-4-phenyl-2-azetidinone, M.P. 212–213°.

3-Phenoxyacetamido-4-phenyl-2-azetidinone

EXAMPLE 3: 3-(α-AMINOPHENYLACETAMIDO)-4-PHENYL-2-AZETIDINONE

A solution of 3-(α-azidophenylacetamido-4-phenyl-2-azetidinone (0.321 g.) in warm ethanol (17 cc.) was hydrogenated at room temperature and atmospheric pressure over pre-reduced Adams' catalyst (0.030 g.) for 2 hours. After the removal of catalyst and solvent, the solid residue was extracted with hot ethyl acetate (15 cc.). The extract was concentrated to 5 cc. and cooled, giving 3-(α-aminophenyl-acetamido)-4-phenyl - 2 - azetidinone, M.P. 183–185°.

EXAMPLE 4: 4 - PHENYL - 3 - (2 - THIENYLACETAMIDO)-2-AZETIDINONE

A solution of 2-thienylacetyl chloride (0.400 g.) in ethanol-free chloroform (5 cc.) was added dropwise to a stirred, ice-cooled solution of 3-amino-4-phenyl-2-azetidinone (0.400 g.) and triethylamine (0.252 g.) in ethanol-free chloroform (9 cc.) during 15 minutes. The mixture was stirred at room temperature for 4 hours and washed successively with dilute hydrochloric acid (1 N; 3 cc.), water, 8% aqueous sodium bicarbonate solution (3 cc.) and water (2×3 cc.). The chloroform layer was dried (MgSO₄) and evaporated in vacuo. The residue was triturated with water and the undissolved solid filtered off, washed with water and dried in vacuo. Recrystallisation from acetone-light petroleum (B.P. 40–60°) gave 4-phenyl-3(-2-thienylacetamido) - 2 - azetidinone, M.P. 160–161°.

The following compound was prepared in a similar manner:

3-(2,6-Dimethoxybenzamido) - 4 - phenyl-2-azetidinone, M.P. 228°.

EXAMPLE 5: 3-(p-AMINOPHENYLACETAMIDO)-4-PHENYL-2-AZETIDINONE HYDROCHLORIDE

A solution of 3-(p-nitrophenylacetamido)-4-phenyl-2-azetidinone prepared as in Example 2 (0.722 g.) in acetic acid (25 cc.) was hydrogenated at room temperature and atmosphere pressure over 10% palladium-on-charcoal catalyst (0.722 g.) until uptake of hydrogen was complete. The catalyst was filtered off and the filtrate evaporated in vacuo. A solution of the oily residue in ethyl acetate was washed with dilute sodium bicarbonate solution, then with water and dried (Na₂SO₄). After the removal of solvent the semi-solid residue was dissolved in hot ethyl acetate (15 cc.) and the solution cooled and filtered. The filtrate was evaporated to dryness. An excess of ethanolic hydrogen chloride solution was added to a solution of the residue in ethanol (5 cc.). The buff precipitate was filtered off and dried, M.P. 245° (decomp).

EXAMPLE 6: 1 - CARBETHOXY - 4 - PHENYL-3-PHENYLACETAMIDO-2-AZETIDINONE

Ethyl chloroformate (10 cc.) was added to 3-phenylacetamido-4-phenyl-2-azetidinone (1.4 g.) anhydrous tetrahydrofuran (50 cc.) and triethylamine (7.5 cc.). After the vigorous reaction had subsided the mixture was stirred for 24 hours and filtered. The filtrate was evaporated in vacuo and the residue recrystallised three times from benzene, affording the product as a white solid, M.P. 154–155°.

EXAMPLE 7: 1-METHYL - 4 - PHENYL-3-PHENYLACETAMIDO-2-AZETIDINONE (a) Benzylidenemethylamine Anhydrous magnesium sulphate (12 g.) was added to a stirred solution of benzaldehyde (10.6 g.) in ethanolic

---

*J. N. Wells and R. E. Lee, J. Org. Chem., 1969, 34, 1477.

methylamine solution (33%; 10 cc.). The mixture was stirred for ca. 16 hours and then filtered. The filtrate was evaporated *in vacuo* and the oily residue fractionated *in vacuo*. B.P. 60°, 3 mm. (70% pure—equivalent weight determination).

(b) 1-Methyl-4-phenyl-3-phthalimido-2-azetidinone

Phthaloylglycyl chloride (21 g.) was added dropwise during one hour to a stirred solution of benzylidenemethylamine (15.5 g.; 70% pure) in anhydrous benzene (155 cc.) containing triethylamine (14.3 cc.). The mixture was kept at room temperature overnight and then filtered. Concentration of the filtrate *in vacuo* gave an oil which was stirred with a little ether. The solid was filtered off and recrystallised from ethanol affording the product as a white solid, M.P. 140°.

(c) 3-Amino-1-methyl-4-phenyl-2-azetidinone

1-Methyl-4-phenyl-3-phthalimido-2-azetidinone (2.25 g.) was added to a solution of hydrazine hydrate (0.41 cc.) in ethanol (120 cc.) and the resulting solution was heated under reflux for 2 hours. On cooling the solid was filtered off and the filtrate concentrated *in vacuo*. The oily residue was dissolved in benzene (10 cc.), the solution filtered and the filtrate evaporated *in vacuo* to give the product as an oil.

(d) 1-Methyl-4-phenyl-3-phenylacetamido-2-azetidinone

A solution of dicyclohexylcarbodiimide (1.8 g.) in anhydrous tetrahydrofuran (20 cc.) was added dropwise during 30 minutes to a stirred solution of 3-amino-1-methyl-4-phenyl-2-azetidinone (1.5 g.) and phenylacetic acid (1.2 g.) in anhydrous tetrahydrofuran (30 cc.). The mixture was stirred overnight and filtered. The filtrate was evaporated in vacuo. Chromatography of the residue on silica gel and elution with ethyl acetate-methanol (3:1) and finally with methanol, followed by crystallisation from benzene, gave the product as a white solid, M.P. 170°.

EXAMPLE 8: 1-FORMYL-4-PHENYL-3-PHENYL-ACETAMIDO-2-AZETIDINONE (a) 1-(2,2-Diethoxyethyl)-4-phenyl-3-phthalimido-2-azetidinone A solution of phthaloylglycyl chloride (17.9 g.) in anhydrous benzene (50 cc.) was added dropwise during one hour to a stirred solution of benzylidene aminoacetal (17.8 g.) (E. Fischer, Ber., 1893, 26, 467) and triethylamine (12 cc.) in anhydrous benzene (100 cc.). The mixture was stirred for a further 3 hours and the solid was filtered off and washed well with anhydrous benzene. The combined filtrate and washings were evaporated *in vacuo*. The oily residue was dissolved in benzene and the solution was concentrated and set aside. The solid that crystallised was filtered off, washed with a little benzene and dried at 80° in vacuo affording the product, M.P. 126–127°.

(b) 3-Amino-1-(2,2-diethoxyethyl)-4-phenyl-2-azetidinone

Hydrazine hydrate (0.66 g.) was added to a solution of 1-(2,2-diethoxyethyl)-4-phenyl - 3 - phthalimido-2-azetidinone (4.08 g.) in ethanol (35 cc.), and the solution heated under reflux for 2 hours. The solid was filtered off and washed well with benzene. The combined filtrate and washings were evaporated *in vacuo* and the oily residue was dissolved in benzene. The solution was filtered and the filtrate evaporated *in vacuo*. Vacuum distillation of the residue gave the product as a colourless oil, B.P. 180–200°/0.15–0.20 mm.

(c) 1-(2,2-Diethoxyethyl)-4-phenyl-3-phenylacetamido-2-azetidinone

A solution of dicyclohexylcarbodiimide (9.27 g.) in anhydrous tetrahydrofuran (20 cc.) was added dropwise during 15 minutes to a solution of 3-amino-1-(2,2-diethoxyethyl)-4-phenyl-2-azetidinone (8.3 g.) and phenylacetic acid (4.08 g.) in anhydrous tetrahydrofuran. The mixture was stirred overnight and filtered. Evaporation of the filtrate *in vacuo* gave an oil. Chromatography on Spence alumina and elution with benzene-ethyl acetate (1:1), and with ethyl acetate, followed by crystallisation from benzene-light petroleum (B.P. 60–80°) afforded the product as a white solid, M.P. 99–100°.

(d) 2-Oxo-4-phenyl-3-phenylacetamido-1-azetidine-acetaldehyde

Hydrochloric acid (5 N; 250 cc.) was added to 1-(2,2-diethoxyethyl) - 4 - phenyl-3-phenylacetamido-2-azetidinone (12.7 g.) in dioxan ("Analar" grade; 250 cc.) and the resulting solution was stirred at room temperature for 7 hours, diluted with water (500 cc.) and saturated with potassium chloride. The mixture was repeatedly extracted with ethyl acetate and the combined extracts were washed with saturated sodium chloride and dried (MgSO$_4$). Evaporation of the solvent *in vacuo* gave the product as a resin (characterised by oxidation to the corresponding acid, M.P. 180–182°).

(e) 1-Formyloxymethyl-4-phenyl-3-phenylacetamido-2-azetidinone

A solution of 2-oxo-4-phenyl-3-phenylacetamido-1-azetidine-acetaldehyde (3.22 g.) in anhydrous chloroform (25 cc.) was added dropwise to a stirred solution of m-chloroperbenzoic acid (2.6 g.) in chloroform (25 cc.) during 15 minutes. The solution was stirred at room temperature in the dark for 26 hours, and then washed with sodium hydrogen carbonate solution, followed by water, and dried (MgSO$_4$). Evaporation of the solvent gave an oil which was dissolved in ether (20 cc.). The ethereal solution was set aside overnight and the white solid was filtered off, washed with ether and dried; M.P. 133–138°.

(f) 1-Formyl-4-phenyl-3-phenylacetamido-2-azetidinone (1) By oxidation of 1-formyloxymethyl-4-phenyl-3-phenylacetamido-2-azetidinone: The Jones reagent (1 cc.) (A. Bowers, T. G. Halsall, E. R. H. Jones and A. J. Lemin, J. Chem. Soc., 1953, 2548) was added dropwise to a stirred solution of 1 - formyloxy-4-phenyl-3-phenylacetamido-2-azetidinone (1.04 g.) in acetone ("Analar" grade; 50 cc.). The reaction mixture was stirred for an additional 10 minutes and the supernatant liquid was decanted and evaporated *in vacuo* (bath temp. of ca. 30°). The residue was taken up in chloroform and washed with water, with dilute sodium hydrogen carbonate solution, and again with water. The solution was dried (Na$_2$SO$_4$), the solvent removed, and the residue crystallised from benzene to give the product as colourless crystals, M.P. 134–136°.

(2) By oxidation of 2-oxo-4-phenyl-3-phenylacetamido-1-azetidine-acetaldehyde: The Jones reagent (6 cc.) was added dropwise to a stirred solution of 2-oxo-4-phenyl-3-phenylacetamido-1-azetidine-acetaldehyde (7.3 g.) in acetone ("Analar" grade; 250 cc.). The mixture was filtered and the filtrate evaporated *in vacuo* (bath temp. of ca. 30°). The oily residue was dissolved in ethyl acetate (150 cc.) and washed thoroughly with water, then with dilute sodium hydrogen carbonate and again with water. The organic phase was dried (MgSO$_4$) and the solvent was evaporated *in vacuo*. A solution of the oily residue in benzene (10 cc.) was filtered and the filtrate set aside at room temperature for 65 hours. The solid was filtered off, washed with a little benzene, and with ether, and dried, affording the product as colourless crystals, M.P. 135–137°.

EXAMPLE 9

10 litres of an intramammary suspension containing 60 mg. of a compound according to the invention of formula (I) and 100,000 I.U. benzylpenicillin as the sodium salt per 5 ml. may be prepared as follows.

Disperse 50 g. of aluminium stearate in sufficient arachis oil and heat at 120° C. until a satisfactory gel has formed. Cool the gel to below 40° C. and carefully incorporate 120 g. of very finely powdered inhibitor and 200 mega units of sodium benzylpenicillin into the gel.

Pack the suspension in suitable containers which enable the product to be administered via the teat canal.

EXAMPLE 10

10 litres of a long acting intramammary suspension containing 150 mg. of an inhibitor of formula (I) and 300,000 I.U. sodium benzylpenicillin per 5 ml. may be prepared as follows.

Disperse 300 g. of aluminium stearate in sufficient arachis oil and heat at 120° C. until a satisfactory gel has formed. Cool the gel to below 40° C. and carefully incorporate 300 g. of very finely powdered inhibitor and 600 mega units of sodium benzylpenicillin into the gel.

Pack the suspension in suitable containers which enable the product to be administered via the teat canal.

EXAMPLE 11

Injections of an inhibitor of formula (I) and benzylpenicillin with or without procaine penicillin are prepared by adding water for injection to a sealed container containing the active ingredients. A suitable mixture of active ingredient would be inhibiting 350 mg., benzylpenicillin 60 mg. and procaine penicillin 300 mg. together with suitable dispersing agents and buffering agents.

We claim:
1. A compound selected from the group consisting of those of the formula:

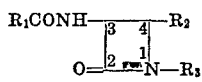

wherein:
$R_1$ is a benzyl, methoxyphenyl, phenoxymethyl, chloroacetamidobenzyl, nitrobenzyl, α-aminobenzyl, azidobenzyl, or aminobenzyl group;
$R_2$ is a phenyl, methoxyphenyl, chlorophenyl, or naphthyl group; and
$R_3$ is hydrogen, an alkyl group containing from 1 to 4 carbon atoms, carbethoxy, or formyl; and the physiologically acceptable acid addition salts thereof.

2. The compound of claim 1 which is 4-(p-methoxyphenyl)-3-phenylacetamido-2-azetidinone.

3. The compound of claim 1 which is 3-(α-azidophenylacetamido)-4-phenyl-2-azetidinone.

4. The compound of claim 1 which is 3-[p-(2,2-dichloroacetamido)phenylacetamido]-4-phenyl-2-azetidinone.

5. The compound of claim 1 which is 3-(p-nitrophenylacetamido)-4-phenyl-2-azetidinone.

6. The compound of claim 1 which is 3-(p-aminophenylacetamido)-4-phenyl-2-azetidinone hydrochloride.

References Cited

Deshpande et al., Indian J. Chem., vol. 4, pp. 79–80 (1966).

ALAN L. ROTMAN, Primary Examiner

U.S. Cl. X.R.

260—332.2 H; 424—244, 275